United States Patent
Gotou et al.

(10) Patent No.: US 8,288,491 B2
(45) Date of Patent: Oct. 16, 2012

(54) PROCESS FOR THE PRODUCTION OF POLYMER MICROPARTICLES

(75) Inventors: Akihiro Gotou, Nagoya (JP); Hideo Matsuzaki, Nagoya (JP); Tomotaka Mizuno, Nagoya (JP)

(73) Assignee: Toagosei Co. Ltd., Tokyo (JP)

( * ) Notice: Subject to any disclaimer, the term of this patent is extended or adjusted under 35 U.S.C. 154(b) by 0 days.

(21) Appl. No.: 12/811,385

(22) PCT Filed: Jan. 22, 2009

(86) PCT No.: PCT/JP2009/050922
§ 371 (c)(1),
(2), (4) Date: Oct. 8, 2010

(87) PCT Pub. No.: WO2009/096300
PCT Pub. Date: Aug. 6, 2009

(65) Prior Publication Data
US 2011/0046329 A1    Feb. 24, 2011

(30) Foreign Application Priority Data

Feb. 1, 2008   (JP) ................................ 2008-022290

(51) Int. Cl.
*C08F 2/18* (2006.01)
*C08F 4/40* (2006.01)
*C08F 220/06* (2006.01)

(52) U.S. Cl. ............ 526/235; 526/86; 526/88; 526/201; 526/909; 526/915; 524/801

(58) Field of Classification Search .................. 524/801; 526/86, 915, 88, 201, 235, 909
See application file for complete search history.

(56) References Cited

U.S. PATENT DOCUMENTS

| | | | |
|---|---|---|---|
| 37,021 A | | 11/1862 | Williston |
| 2,982,749 A | * | 5/1961 | Friedrich et al. ............ 526/207 |
| 3,810,878 A | * | 5/1974 | Sato et al. .................... 526/220 |
| 5,180,798 A | | 1/1993 | Nakamura et al. |
| 5,624,967 A | | 4/1997 | Hitomi et al. |
| 6,395,793 B1 | | 5/2002 | Kadonaga et al. |
| 2006/0229369 A1 | | 10/2006 | Frank et al. |
| 2010/0069592 A1 | * | 3/2010 | Matzuaki et al. ............. 526/287 |

FOREIGN PATENT DOCUMENTS

| | | |
|---|---|---|
| JP | 3 227301 | 8/1991 |
| JP | 05 222107 | 8/1993 |
| JP | 8 188 602 | 7/1996 |
| JP | 2003 034725 | 2/2003 |
| JP | 2003 517508 | 5/2003 |
| JP | 2003 301019 | 10/2003 |
| JP | 2004 262747 | 9/2004 |
| JP | 2007 502879 | 2/2007 |
| WO | WO 01/36493 A1 | 5/2001 |
| WO | WO 2005/021598 A1 | 3/2005 |
| WO | WO 2008/015870 A1 * | 2/2008 |

OTHER PUBLICATIONS

International Search Report issued Apr. 13, 2009 in PCT/JP09/50922 filed Jan. 22, 2009.
U.S. Appl. No. 12/865,028, filed Jul. 28, 2010, Gotou, et al.
U.S. Appl. No. 12/811,658, filed Jul. 2, 2010, Gotou, et al.
U.S. Appl. No. 12/811,948, filed Jul. 7, 2010, Hibino, et al.
Extended European Search Report issued Aug. 23, 2011, in Patent Application No. 09706762.3.
Office Action issued May 7, 2012 in European Patent Application No. 09 706 762.3-2109.

* cited by examiner

*Primary Examiner* — Fred M Teskin

(74) *Attorney, Agent, or Firm* — Oblon, Spivak, McClelland, Maier & Neustadt, L.L.P.

(57) ABSTRACT

A process for producing high-quality polymer microparticles having uniform particle size of the order of several micrometers to tens of micrometers by inverse suspension polymerization at high productivity while keeping excellent dispersion stability without causing aggregation among particles. The inverse suspension polymerization involves a vinyl monomer and is performed in at least two steps. A water-soluble oxidizing agent and a water-soluble reducing agent are used as a polymerization initiator, and the water-soluble reducing agent is fed after the water-soluble oxidizing agent is fed.

9 Claims, 3 Drawing Sheets

PROCESS FOR THE PRODUCTION OF POLYMER MICROPARTICLES

CROSS REFERENCE TO RELATED APPLICATIONS

This application is the National Stage of PCT/JP09/050,922, filed Jan. 22, 2009, the disclosure of which is incorporated herein by reference in its entirety. This application claims priority to Japanese Application No. 2008-022290, filed Feb. 1, 2008, the disclosure of which is incorporated herein by reference in its entirety.

FIELD OF THE INVENTION

The present invention relates to a method for producing polymer microparticles. More specifically, the present invention relates to a method for producing high-quality polymer microparticles uniform in particle size having a specific range of particle size by inverse suspension polymerization of a vinyl-based monomer while dividing at least two steps, at high productivity, without causing aggregation of particles and in a stable even if the scale is increased.

BACKGROUND ART

Micron-sized spherical polymer microparticles are utilized for cosmetic additives, supports for various chemical materials, spacers, column packings for chromatography, light diffusion agents, porosification agents, weight-lightening agents, antiblocking agents, surface modification agents for recording paper, and the like.

Among these, hydrophilic crosslinked polymer microparticles can be used as a hydrous gel microparticle, and is useful as cosmetics additives, supports, porosification agents, weight-lightening agents, and surface modification agents for recording paper.

Production of polymer particles by inverse suspension polymerization of a vinyl-based monomer has conventionally been carried out. As technologies of producing hydrophilic crosslinked polymer particles by inverse suspension polymerization, there have been known a method in which a water-in-oil microdispersed droplet of a monomer is formed using a compound having a specific HLB as a dispersing agent before polymerization and then the monomer is polymerized while dropping it (see Patent Document 1), a method in which inverse suspension polymerization is carried out in the presence of a water-absorptive polymer particle, an oil-soluble polymerization initiator and a dispersing agent, and during or after the polymerization a hydrophobic vinyl-based monomer and an oil-soluble polymerization initiator are added to perform polymerization (see Patent Document 2), a method in which a hydrophilic vinyl-based monomer is inverse suspension polymerized in the presence of a silicone compound having at least one functional group in the reaction system (see Patent Document 3), and the like.

In these conventional technologies, there are problems that the dispersion stability of polymer particles during or after polymerization is not sufficient, the particle size of polymer particles obtained is nonuniform, and the hydrophilicity of polymer particles obtained is degraded. In particular, when hydrophilic particles with a high degree of crosslinking are produced while increasing the proportion of a multifunctional vinyl-based monomer used, polymerization stability is significantly degraded, and problems such as aggregation of particles, degradation in the quality of polymer particles obtained, and a reduction in productivity easily occur.

Since all the above-mentioned production methods are ones in which polymerization is performed by feeding a monomer emulsion continuously over one hour or more to a reactor heated to a high temperature of 70° C. or higher, aggregation of particles or the like easily occurs and the particle size of the resulting polymer particles becomes irregular. In addition, when a large amount of a crosslinking agent such as a multifunctional vinyl-based monomer, is used, most part of unreacted crosslinking agent becomes easy to flow out into a continuous phase side, and when polymerization is continued in this state, particles aggregate more and this is expected to lead to the aforementioned deterioration in quality of polymer particles.

Furthermore, Patent Document 4 discloses an absorptive polymer particle which is produced by inverse suspension polymerization using a redox polymerization initiator for the production of a water absorptive polymer having a specific water absorptivity, and a polymer particle is produced by feeding tert-butyl hydroxyperoxide which is an oil-soluble oxidizing agent, and then feeding sodium bisulfite which is a water-soluble reducing agent.

According to this production method, particle size control of microparticles can be performed more precisely in comparison to aforementioned conventional technologies. Since a polymerization reaction occurs before the water-soluble reducing agent is diffused sufficiently, this is not satisfactory as a method for producing a high-quality particle that is uniform in particle size and has a particle size falling within a specified range, in a stable state without causing, for example, aggregation of particles.

Patent Document 1: JP-A H05-222107
Patent Document 2: JP-A 2003-301019
Patent Document 3: JP-A 2003-34725
Patent Document 4: JP-A 2004-262747

DISCLOSURE OF THE INVENTION

Problems that the Invention is to Solve

The object of the present invention is to provide a method for the production of high-quality polymer microparticles uniform in particle size having a particle size of the order of several micrometers to tens of micrometers at high productivity while keeping excellent dispersion stability without causing aggregation of particles by inverse suspension polymerization while dividing at least two steps.

In particular, the object of the present invention is to provide an inverse suspension polymerization method in which high-quality polymer microparticles uniform in particle size can be smoothly produced at high productivity while keeping high polymerization stability and suspension stability even if hydrophilic particles having a high degree of crosslinking are produced.

Means for Solving the Problems

The present inventors have engaged in an intensive investigation in order to attain the above objects. The inventors thought that it is important to perform the polymerization at a lower temperature for a shorter time in comparison to the conventional technologies for the production of polymer microparticles by subjecting a vinyl-based monomer to inverse suspension polymerization, and studied the conditions. As a result, when a water-soluble oxidizing agent and a water-soluble reducing agent are used as a polymerization initiator, and inverse suspension polymerization is carried out, it is found that high-quality spherical particles having a particle size of the order of several micrometers to tens of micrometers and being uniform in particle size can be produced at high productivity while keeping excellent dispersion stability and polymerization stability without causing aggregation, clumping, and adhesion to a polymerization apparatus of polymer particles during or after polymerization.

Further, in the case where the charging amount of the monomer is increased, there is a risk that the reaction liquid boils due to the polymerization heat and the inside of the reactor falls into a pressurized condition. Therefore, the production is required to be carried out in a safe range while balancing the polymerization heat and the heat capacity of raw materials such as a solvent, water and monomer. In this case, there is a problem that the quantity of a product to be obtained in one process is limited and the productivity is low. As a result of studying this problem earnestly, it was found that when the polymerization was performed dividing at least two steps, the productivity of polymer microparticles could be improved.

The present invention for solving the above-mentioned problems is as follows.

The first invention is a method for producing polymer microparticles by inverse suspension polymerization of a vinyl-based monomer, and is characterized in that the inverse suspension polymerization is conducted dividing at least two steps, and that a water-soluble oxidizing agent and a water-soluble reducing agent are used as a polymerization initiator.

The second invention is a method for producing polymer microparticles according to the first invention, wherein hydrogen peroxide is added to a reaction liquid before adding an aqueous solution of a monomer in any one polymerization step.

The third invention is a method for producing polymer microparticles according to the first or second inventions, wherein a hydrophilic polymerization inhibitor having an octanol/water partition coefficient (logPow) of 1.6 or less is added for the preparation of an aqueous solution of a monomer.

The fourth invention is a method for producing polymer microparticles according to any one of the first to third inventions, wherein oxygen is charged into a reactor.

The fifth invention is a method for producing polymer microparticles according to any one of the first to fourth inventions, wherein the stirring revolution speed is increased at least once before the polymerization process is completed.

The sixth invention is a method for producing polymer microparticles according to any one of the first to fifth inventions, wherein a macromonomer having a radically polymerizable unsaturated group at an end of a polymer derived from a vinyl-based monomer is used as a dispersion stabilizer.

The seventh invention is a method producing polymer microparticles according to any one of the first to sixth inventions, wherein the polymer microparticles produced by inverse suspension polymerization are polymer microparticles having a crosslinking density of 0.5% or more by mol.

The eighth invention is a method producing polymer microparticles according to any one of the first to seventh inventions, wherein the polymer microparticles produced by inverse suspension polymerization are polymer microparticles which have an average particle size in a saturated water-swollen state of 2 to 100 μm, and a content ratio of particles having a particle size of 150 μm or larger in a saturated water-swollen state of 1.0% or less by weight.

The ninth invention is a method for producing polymer microparticles according to any one of the first to seventh inventions, wherein the polymer microparticles produced by inverse suspension polymerization are polymer microparticles which have a water absorption ratio of 5 to 50 times, an average particle size in a saturated water-swollen state of 5 to 70 μm, and a content ratio of particles having a particle size of 150 μm or larger in a saturated water-swollen state of 0.3% or less by weight.

Effect of the Invention

According to the production method of the present invention, high-quality spherical hydrophilic polymer microparticles remarkably higher uniform in particle size than those by conventional technologies can be produced at high productivity while keeping high dispersion stability and polymerization stability without causing aggregation, clumping and adhesion to a polymerization apparatus of particles during or after polymerization. Moreover, according to the production method of the present invention, even if hydrophilic polymer particles having a high degree of crosslinking are produced using a large amount of a multifunctional vinyl-based monomer, high-quality hydrophilic crosslinked polymer microparticles uniform in particle size can be produced without causing aggregation, clumping and adhesion to a polymerization apparatus of particles. Furthermore, when the production is carried out under conditions of an increased scale for increasing the productivity, the production method of the present invention can lead to high-quality polymer microparticles.

EXPLANATION OF THE REFERENCE NUMBERS

1: burette, 2: pinch cock, 3: silicone tube, 4: polytetrafluoroethylene tube, 5: funnel, 6: sample (polymer microparticles), 7: filter paper for fixing sample (polymer microparticles), 8: supporting cylinder, 9: adhesive tape, 10: filter paper for device, 11: lid, 12: ion exchange water

BEST MODE FOR CARRYING OUT THE INVENTION

Hereinafter, the embodiments of the present invention are described in detail.

The "inverse suspension polymerization of a vinyl-based monomer" according to the present invention means a polymerization using an oil phase as a dispersion medium and an aqueous phase as a dispersoid. In general, in the case where polymerization is performed using a hydrophilic vinyl-based monomer, particles are produced by w/o type inverse suspension polymerization in which an aqueous phase (an aqueous solution of a hydrophilic vinyl-based monomer) is suspended in the form of droplets in an oil phase (a dispersion medium composed of a hydrophobic organic solvent).

The inverse suspension polymerization of a vinyl-based monomer according to the present invention is one in which the vinyl-based monomer is subjected to inverse suspension polymerization dividing at least two steps and using a water-soluble oxidizing agent and a water-soluble reducing agent in the presence of a dispersion stabilizer.

The preferable method in the present invention is one which comprises charging a monomer mixture prepared in advance by stirring and uniformly dissolving a vinyl-based monomer (and its neutralized product) and water to a reaction liquid in which an oil phase prepared using a dispersion stabilizer and a hydrophobic organic solvent has been charged, and then feeding a water-soluble oxidizing agent and a water-soluble reducing agent to initialize the polymerization. The present production method is one in which the inverse suspension polymerization is conducted dividing at least two steps. An aqueous solution of a monomer for the next step is charged into a slurry of polymer microparticles prepared in the prior step. The monomer is polymerized to prepare a slurry containing polymer microparticles having a higher concentration. When this operation is carried out repeatedly, the inverse suspension polymerization can be performed in at least two steps. The polymerization of the prior step and the polymerization of the next step may be performed using the same reactor, or alternatively the next step polymerization may be performed after transferring the produced slurry of polymer microparticles to another reactor.

A more number of divided steps of the polymerization is preferable from the viewpoint of production efficiency. However, it is preferably made two steps to five steps, and more preferably two steps to three steps because when reaction steps are increased, problems such as broadening of particle size distribution arise easily.

As to the aqueous solutions of monomers to be used for the respective steps, either different compositions may be used for the respective step or the same composition may be used. When the same composition is used, it is possible to prepare the whole amount of solution at one time and then use it in lots for the polymerizations of the respective steps.

There is no particular limitation on the proportion at what amount of monomers are polymerized in each step, it is preferable to polymerize monomers at any proportion of from 10 to 90 in each step where the total amount of the monomers is 100. If the amount of monomers to be polymerized in each step is excessively small, this is not efficient. If the amount is excessively large, it is undesirable because the temperature may reach the boiling point of the reaction liquid during polymerization.

The vinyl-based monomer for the inverse suspension polymerization according to the present invention is not particularly limited so long as it is a radically polymerizable vinyl-based monomer. For example, a hydrophilic monomer having a hydrophilic group such as a carboxyl group, an amino group, a phosphoric acid group, a sulfonic acid group, an amide group, a hydroxyl group, a quaternary ammonium group or the like can be used. Among these, when a monomer having a carboxyl group, a sulfonic group or an amide group is used, polymer microparticles high in hydrophilicity and excellent in water absorption capacity and water-retaining property can be obtained, being preferable.

Specific examples of the hydrophilic vinyl-based monomer include a vinyl-based monomer having a carboxyl group or its (partially) alkali-neutralized product, such as (meth) acrylic acid, crotonic acid, itaconic acid, maleic acid, fumaric acid, monobutyl itaconate, monobutyl maleate and cyclohexanedicarboxylic acid; a vinyl-based monomer having an amino group or its (partially) acid-neutralized product or its (partially) quaternary product, such as N,N-dimethylaminoethyl(meth)acrylate, N,N-diethylaminoethyl(meth)acrylate, N,N-dimethylaminoepropyl(meth)acrylate, and N,N-dimethylaminopropyl(meth)acrylamide; N-vinylpyrrolidone, acryloylmorpholine; a vinyl-based monomer having a phosphoric acid group, or its (partially) alkali-neutralized product, such as acid phosphoxyethyl methacrylate, acid phosphoxypropyl methacrylate, and 3-chloro-2-acid phosphoxypropyl methacrylate; a vinyl-based monomer having a sulfonic acid group or phosphonic acid group, or its (partially) alkali-neutralized product, such as 2-(meth)acrylamide-2-methylpropanesulfonic acid, 2-sulfoethyl(meth)acrylate, 2-(meth)acryloylethanesulfonic acid, allylsulfonic acid, styrene sulfonic acid, vinylsulfonic acid, allylphosphonic acid, and vinylphosphonic acid; a nonionic hydrophilic monomer such as (meth)acrylamide, N,N-dimethyl acrylamide, N-isopropyl acrylamide, N-methylol(meth)acrylamide, N-alkoxymethyl (meth)acrylamide, (meth)acrylonitrile, hydroxyethyl(meth) acrylate, hydroxypropyl(meth)acrylate and the like. These compounds may be used singly or in combination of two or more types thereof.

Using a compound selected from (meth)acrylic acid, (meth)acrylamide and 2-acrylamide-2-methylpropanesulfonic acid singly or in combination of two or more types for the inverse suspension polymerization is preferable from the viewpoint that polymerizability is excellent and resulting particles are excellent in water absorption property. The particularly preferred is (meth)acrylic acid.

In the present invention, a multifunctional vinyl-based monomer having two or more radically polymerizable unsaturated groups may be used as a vinyl-based monomer together with at least one of the above-mentioned monofunctional hydrophilic vinyl-based monomer for the inverse suspension polymerization.

Therefore, the "vinyl-based monomer" according to the present invention is a general term for the monofunctional vinyl-based monomer and the multifunctional vinyl-based monomer.

The multifunctional vinyl-based monomer is not particularly limited so long as it has two or more groups radically polymerizable with the above-mentioned hydrophilic vinyl-based monomer, and specific example thereof includes a di- or tri-(meth)acrylate of a polyol, such as polyethylene glycol di(meth)acrylate, polypropylene glycol di(meth)acrylate, glycerin tri(meth)acrylate, trimethylolpropane tri(meth)acrylate, and a tri(meth)acrylate of a modified trimethylolpropane ethylene oxide; a bisamide such as methylenebis(meth)acrylamide; divinyl benzene, allyl(meth)acrylate, and the like. These compounds may be used singly or in combination of two or more types thereof.

Among these, polyethylene glycol diacrylate and methylene bisacrylamide are suitably used as the multifunctional vinyl-based monomer because it excels in solubility in a mixed liquid of water and a hydrophilic vinyl-based monomer and it is advantageous in being used in an amount increased for obtaining a high degree of crosslinking. The particular preferred is polyethylene glycol di(meth)acrylate.

The amount of the multifunctional vinyl-based monomer to be used depends on the type of the vinyl-based monomer to be used and the intended application of resulting particles. When the polymer particles are required to have crosslinked characteristics, the amount thereof is preferably in the range from 0.1 to 100 mol, more preferably from 0.2 to 50 mol, and further preferably from 0.5 to 10 mol based on 100 mol of the total amount of the monofunctional vinyl-based monomer to be used.

Examples of the hydrophobic organic solvent that forms an oil phase (dispersion medium) in the inverse suspension polymerization according to the present invention include an aliphatic hydrocarbon solvent having 6 or more carbon atoms; an aromatic hydrocarbon solvent such as benzene toluene, xylene and ethyl benzene; a silicone-based solvent such as octamethylcyclotetrasiloxane, and the like. In particular, hexane, cyclohexane, and n-heptane are suitably used because the solubilities of vinyl-based monomer and water in the solvent are small and they can be removed easily after polymerization.

In the inverse suspension polymerization according to the present invention, a hydrophilic vinyl-based monomer (and a neutralized salt thereof) is preferably dissolved in water to form an aqueous solution and then is added to the polymerization system. The concentration of the hydrophilic vinyl-based monomer in the aqueous solution in which the hydrophilic vinyl-based monomer is dissolved is preferably in the range from 5% to 80% by weight, and particularly from 20% to 60% by weight from the viewpoint that the inverse suspension polymerization proceeds smoothly and the productivity is good.

In the case where the hydrophilic vinyl-based monomer for the inverse suspension polymerization is a vinyl-based monomer having an acidic group such as a carboxyl group and a sulfonic acid group, when the hydrophilic vinyl-based monomer is added to water and the acidic group in the vinyl-based monomer is neutralized with an alkali aqueous solution such as aqueous ammonia, an aqueous sodium hydroxide solution, and an aqueous potassium hydroxide solution, an aqueous solution can be prepared in which the vinyl-based monomer is dissolved sufficiently.

In the producing method of the present invention, a dispersion stabilizer is an essential component.

Specific examples of the dispersion stabilizer include a macromonomer type dispersion stabilizer, and a nonionic surfactant such as a sorbitan fatty acid ester, a polyglycerol fatty acid ester, a sucrose fatty acid ester, sorbitol fatty acid ester and a polyoxyethylene alkyl ether.

Among these, a macromonomer type dispersion stabilizer is preferable. The macromonomer type dispersion stabilizer is a vinyl-based monomer-derived polymer having, at an end thereof, a radically polymerizable unsaturated group.

Moreover, it is preferable to use a relatively high hydrophobic nonionic surfactant having an HLB of 3 to 8, such as sorbitan monooleate and sorbitan monopalmitate, together with a macromonomer type dispersion stabilizer. These surfactants may be used singly or in combination of two or more types thereof.

The preferable macromonomer as the above-mentioned macromonomer type dispersion stabilizer are a macromonomer having an α-substituted vinyl group represented by the following formula (1), at an end of a polymer obtained by radical polymerization of a vinyl-based monomer at a temperature range of 150° C. to 350° C., and/or a macromonomer having a (meth)acryloyl group at an end of a polymer derived from a vinyl-based monomer.

$$H_2C=C(X)-\qquad(1)$$

(In the Formula, X is a Monovalent Polar Group.)

These macromonomers are excellent as a dispersion stabilizer and preferable. The weight average molecular weight of the macromonomer is preferably in the range from 1,000 to 30,000. The macromonomer preferably has both structural units derived from a hydrophilic vinyl-based monomer and a hydrophobic vinyl-based monomer. The structural unit derived from the hydrophobic vinyl-based monomer is preferably a structural unit derived from a (meth)acrylic acid alkyl ester having 8 or more carbon atoms, and the structural unit derived from the hydrophilic vinyl-based monomer is preferably a structural unit derived from a vinyl-based monomers having a carboxyl group.

In particular, when the hydrophilic particles are produced by the inverse suspension polymerization of a vinyl-based monomer using a macromonomer type dispersion stabilizer, it is preferable to use a multifunctional vinyl-based monomer together with a monofunctional compound. Thereby hydrophilic particles having improved strength and shape retainability can be obtained.

The dispersion stabilizer is preferably added to a polymerization system after being dissolved or uniformly dispersed in a hydrophobic organic solvent that is a dispersion medium (oil phase).

The amount of the dispersion stabilizer to be used is preferably in the range from 0.1 to 50 parts by weight, more preferably from 0.2 to 20 parts by weight, and further preferably from 0.5 to 10 parts by weight based on 100 parts by weight of the total amount of the vinyl-based monomer in order to obtain hydrophilic polymer microparticles uniform in particle size while maintaining excellent dispersion stability. If the amount of the dispersion stabilizer used is too small, the dispersion stabilities of the vinyl-based monomer and formed polymer microparticles in the polymerization system becomes poor, and the formed particles easily aggregate, precipitate, and have variation in particle size. On the other hand, if the amount of the dispersion stabilizer used is too large, the amount of the microparticles (having size of 1 μm or smaller) by-produced may be increased.

In the inverse suspension polymerization according to the present invention, it is preferable to carry out the polymerization so that the weight ratio of an oil phase (dispersion medium) to an aqueous phase (dispersoid) in the polymerization system may become from 99:1 to 20:80, and particularly 95:5 to 30:70, from the viewpoint that productivity, dispersion stability during polymerization, and control of particle size of the polymer microparticles can be satisfied at the same time.

The inverse suspension polymerization according to the present invention is preferably carried out under stirring and the reaction is preferably performed in a reaction vessel equipped with a stirring blade or a baffle. As the stirring blade, an anchor blade and a paddle blade are preferable, and a paddle blade is particularly preferred. Generally, suspension polymerization is influenced by stirring power. If the stirring power is excessively low, polymer microparticles having a desired particle size cannot be obtained or it is impossible to inhibit an aqueous solution of monomers from merging, and, as a result, problems may arise, such as that perfectly spherical microparticles can not be obtained or that many aggregated particles are formed.

In the present invention, the stirring power per unit volume in the reaction vessel is preferably 0.5 kw/m³ or higher, and particularly 1.0 kw/m³ or higher.

Since the inverse suspension polymerization having at least two steps is performed in the present invention, the viscosity of the reaction liquid tends to be increased with progress of the polymerization step. The stirring speed may be increased as necessary. In order to obtain polymer microparticles uniform in particle size, it is desirable to increase the stirring revolution speed at least once before the polymerization step is completed.

The range of change of the stirring revolution speed is preferably made 1.1 times to 3.0 times, more preferably 1.1 times to 2.5 times, and further preferably 1.1 times to 2.0 times based on the speed before the changing though it varies depending upon reaction conditions and therefore it is not limited particularly.

When the stirring revolution speed is not increased or when the stirring revolution speed is reduced, decrease in catalyst diffusion speed may become a problem. Therefore, the uniformity of particles may be lowered or aggregates may be generated. That the stirring revolution speed exceeds beyond 3.0 times based on the speed before the changing, it is undesirable because the load on the stirrer may become a problem.

In the inverse polymerization according to the present invention, a redox type initiator including a water-soluble oxidizing agent and a water-soluble reducing agent is used as a polymerization initiator. A redox reaction makes it possible to proceed a polymerization initiation at a low temperature, increase the concentration of a vinyl-based monomer in a polymerization reaction liquid and increase the polymerization rate. Therefore, the productivity can be improved and the molecular weight of a polymer formed can be higher.

In the present invention, the known oxidizing agent can be used as a water-soluble oxidizing agent. Examples of the oxidizing agent capable of using suitably include hydrogen peroxide, ammonium peroxodisulfate, potassium peroxosulfate, sodium peroxosulfate and the like. The oxidizing agent may be used singly or in combination of two or more types thereof. Among these, ammonium peroxodisulfate, potassium peroxosulfate and sodium peroxosulfate are preferable. Particularly preferred is ammonium peroxodisulfate.

Reducing agents known as a reducing agent to be used as a redox type polymerization initiator can be used as the water-soluble reducing agent. Among these, sodium sulfite, sodium hydrogensulfite, and sodium hydrosulfite are preferable. Particularly preferred is sodium hydrosulfite. These compounds may be used singly or in combination with iron (III) chloride or iron (III) sulfate.

Since the water-soluble reducing agent as such is deactivated gradually through their contact with air, it is preferable to dissolve the agent in water several minutes before a desired time of starting polymerization and then add it within 15 minutes.

The method for feeding the water-soluble oxidizing agent and water-soluble reducing agent is not particularly limited and it is preferable that the water-soluble oxidizing agent is fed to a reactor first and then the water-soluble reducing agent is fed to the reactor for polymerization.

The amount of the polymerization initiator to be used may be adjusted according to the types of the vinyl-based monomer and the particle size and molecular weight of the resultant polymer microparticles. The amount of the water-soluble oxidizing agent is in the range from 0.001 to 0.15 mol, and particularly from 0.003 to 0.07 mol based on 100 mol of the total of the vinyl-based monomer.

Additionally, the ratio of the water-soluble oxidizing agent and the water-soluble reducing agent is not particularly limited. The molar ratio of the water-soluble oxidizing agent to the water-soluble reducing agent is preferably 1.0 to 0.25-15.0, and particularly 1.0 to 1.0-10.0.

If the ratio is outside that range, the unfavorable may be occurred. Example thereof includes a generation of aggregates caused by lowering of the reaction rate of monomers, shortening of the chain of polymer constituting particles, remaining of a catalyst after the completion of polymerization; and the like.

In the inverse suspension polymerization according to the present invention, the temperature of the reaction liquid at the time of starting the polymerization is preferably in the range from 0° C. to 40° C., more preferably from 5° C. to 30° C., and particularly from 10° C. to 25° C. If the reaction start temperature is lower than 0° C., freezing of a polymerization facility or a reaction solution becomes a problem and a large cost is required for cooling. On the other hand, if the reaction start temperature exceeds 40° C., it is necessary, from a safety aspect, to reduce the amount of monomers to be fed, resulting in a large production cost.

In the case where the inverse suspension polymerization is performed in at least two steps in the present invention, a polymerization initiator remaining unreacted in a reaction system may affect the polymerization of the next step. For example, in an aqueous solution of a monomer for the second step, polymerization may proceed at an unintentional timing due to the reducing agent or the oxidizing agent remaining since the prior step. If the polymerization proceeds at such an unintentional timing, problems may be occurred, for example, the aqueous solution of a monomer for the second step may undergo polymerization before being atomized to a desired size, generating coarse particles.

For the purpose of preventing such a phenomenon, it is preferable to add a hydrophilic polymerization inhibitor when the aqueous solution of a monomer is prepared. Since commercially available hydrophilic monomer usually contains a hydrophilic polymerization inhibitor, production can be performed without further adding it positively. However, for the purpose of preventing the above-mentioned problem more effective and obtaining a good product containing more reduced coarse particles, a hydrophilic polymerization inhibitor may be added.

The hydrophilic polymerization inhibitor capable of using for such purposes is one having an octanol/water partition coefficient logPow provided in Japanese Industrial Standards Z 7260-107 or OECD TEST Guideline 107 of 1.6 or less. Example thereof includes a phenol compound such as p-methoxy phenol, a quinone compound such as hydroquinone, a nitroso compound, ascorbic acid (salts), potassium iodide, a nitrite and the like. Among these, a phenol compound and a quinone compound are preferred because of their easy availability. Particularly preferred is p-methoxy phenol.

The amount of the hydrophilic polymerization inhibitor to be added is preferably in the range from 10 to 1,000 ppm relative to the aqueous solution of a monomer. The amount is more preferably from 10 to 500 ppm, and further preferably from 10 to 300 ppm. The addition beyond 1,000 ppm may affect the polymerization reaction and the amount of the monomer which remains unreacted may increase, being undesirable.

In addition, for the purpose of preventing the effect caused by the polymerization initiator remaining unreacted, it is preferable to supply oxygen into the reactor. From the safety aspect, it is preferable to supply oxygen in the form of a mixed gas with an inert gas such as nitrogen, and the oxygen concentration in the mixed gas is preferably in the range from 3% to 10%, and more preferably from 5% to 9%.

The timing of supplying oxygen is preferably set between a time when the polymerization reaction rate of the prior step became 50% or more and a time of starting the addition of an aqueous solution of a monomer for the next step. The more preferable timing of supply is between a time when the polymerization reaction rate of the prior step became 80% or more and a time of starting the addition of the aqueous solution of a monomer for the next step, and further preferable timing of supply is between a time when the polymerization reaction rate of the prior step became 90% or more and a time of starting the addition of the aqueous solution of a monomer for the next step.

The amount of oxygen or the mixed gas of oxygen and an inert gas to be supplied is preferably in the range from 5 to 200 per hour, and more preferably from 10 to 150 per hour based on 100 of the volume of the reaction liquid. If the amount is less than 5 per hour, a sufficient effect may not be obtained, being undesirable. If the amount is more than 200 per hour, troubles may occur, for example, the inside of the reactor may fall into a pressurized condition or a solvent may evaporate, being also undesirable.

As a matter of course, it is desirable to remove oxygen fully from a reactor before performing an intended polymerization by, for example, reducing the pressure or blowing an inert gas so that the intended polymerization may not be inhibited.

Further, for the purpose of preventing the influence of the polymerization initiator catalyst remaining unreacted, especially, deactivating a residual reducing agent, it is desirable to add hydrogen peroxide to the reaction liquid. As to hydrogen peroxide, a commercially available product may be used as received or it may be used after being diluted with water.

The amount of hydrogen peroxide to be added is adjusted to preferably 0.05 to 2 times, and more preferably 0.1 to 1.5 times of the molar number of the reducing agent used in the prior step. If the amount is less than this range, it is impossible to deactivate the reducing agent sufficiently, being undesirable. If the amount is more than that range, in the following step, unreacted hydrogen peroxide may deactivate also a necessary reducing agent to inhibit polymerization, being undesirable.

The timing of supplying hydrogen peroxide is preferably set between a time when the polymerization reaction rate of the prior step became 50% or more and a time of starting the addition of an aqueous solution of a monomer for the next step. The more preferable timing of supply is between a time when the polymerization reaction rate of the prior step became 80% or more and a time of starting the addition of the aqueous solution of a monomer for the next step, and further preferable timing of supply is between a time when the polymerization reaction rate of the prior step became 90% or more and a time of starting the addition of the aqueous solution of a monomer for the next step.

In the production method of the present invention, the average particle size of the resultant polymer microparticles is preferably in the range from 2 to 150 μm, more preferably from 2 to 100 μm, and further preferably from 5 to 70 μm. If the average particle size is smaller than 2 μm, the slipping property or blocking preventing function may be insufficient. If it exceeds 150 μm, an problem such as unfavorable appearance, deterioration of touch feeling and lowering of the strength after incorporating materials may be occurred. When the size of the polymer microparticles becomes smaller, the stabilizing effect of the dispersion stabilizer comes to be needed more because the interfacial area between a continuous phase and a dispersed phase becomes larger.

As to the size of the polymer microparticles, the size under a condition where the particles are used becomes important. When the polymer microparticles are used as water-swollen particles, it is preferable that the size when the particles are swollen with water be within the above-mentioned range.

The polymer microparticles are preferably crosslinked. As mentioned above, the crosslinking structure of a polymer constituting the microparticles is based on copolymerization of a multifunctional vinyl-based monomer.

It is also possible to adjust the degree of crosslinking by reacting a crosslinking agent after polymerizing a vinyl-based monomer having a functional group by the inverse suspension polymerization. For example, there is a method in which polymer microparticles of a monomer having a carboxyl group is subjected to crosslinking with ethylene glycol diglycidyl ether.

Alternatively, a polymer can be crosslinked by a known method such as ionic bond type crosslinking via a multivalent metal ion and covalent bond type crosslinking in which crosslinking is achieved by application of radiation.

When the polymer microparticles according to the above-mentioned crosslinking method are having a crosslink density of 0.5% or more by mol, the particle can exert its characteristics in various applications mentioned above. Therefore, it is preferable that the polymer microparticles have a crosslink density of 0.5% or more by mol.

After forming a dispersion liquid of polymer microparticles by inverse suspension polymerization according to the present invention, a dry powder of the polymer microparticles can be obtained using a known method. A method of obtaining a dry powder by heating the dispersion liquid as it is and then removing volatile components under a reduced pressure reduction, and a method comprising removing a dispersion stabilizer, unreacted monomers and the like by performing solid-liquid separation by filtration or centrifugal separation, and washing, and then performing drying, are selected. To perform a washing step is desirable because the primary dispersion property of the microparticles after drying increases.

Additionally, it is desirable to remove water before drying by azeotropic distillation or the like since the dispersed phase contains water. When the water is removed beforehand, it is possible to prevent particles from fusing at the time of drying and, as a result, the primary dispersion property of the particles after drying increases.

According to the present invention, it is possible to smoothly produce polymer particles having an average particle size in a saturated water-swollen state of 2 to 100 μm and a content ratio of particles having a particle size of 150 μm or larger in a saturated water-swollen state of 1.0% or less by weight. Such polymer particles can demonstrate its characteristics remarkably in various applications.

Furthermore, it is also possible to produce polymer particles having a water absorption ratio of 5 to 50 times, an average particle size in a saturated water-swollen state of 5 to 70 μm, and a content ratio of particles having a particle size of 150 μm or larger in a saturated water-swollen state of 0.3% or less by weight. The polymer will become polymer particles that lead to excellent characteristics in various applications.

It is noted that the water absorption ratio of the polymer microparticles, the average particle size in a state where the particle is saturated and swollen with water, and the content of a particle saturated and swollen with water having a particle size of 150 μm or larger in the present specification are values measured or determined by the methods described in the following Example section.

EXAMPLES

Hereinafter, the present invention is described in detail using Examples. In the following description, "part" means part by weight and "%" means % by weight.

Production Example 1

Production of Macromonomer Compositions UM-1 and UM-1HP

The temperature of an oil jacket of a 1,000-mL pressuring stirring vessel type reactor with the oil jacket was kept at 240° C.

A monomer mixture liquid prepared in proportions of 75.0 parts of lauryl methacrylate (hereinafter referred to as "LMA") and 25.0 parts of acrylic acid (hereinafter referred to as "AA") as a monomer, 10.0 parts of methyl ethyl ketone (hereinafter referred to as "MEK") as a polymerization solvent, and 0.45 part of di-tert-butyl peroxide (hereinafter referred to as "DTBP") as a polymerization initiator was charged into a tank for starting material.

Feed of the monomer mixture liquid in the tank for starting material to a reactor was started, and the feed of the monomer mixture liquid and extraction of a reaction mixture liquid were carried out so that the weight of the contents within the reactor would be 580 g and the average residence time would be 12 minutes. The temperature in the reactor and the pressure in the reactor were adjusted to 235° C. and 1.1 MPa, respectively. The reaction mixture liquid extracted from the reactor was depressurized to 20 kPa and continuously fed to a thin-film evaporator maintained at 250° C. Thereby a macromonomer composition from which a monomer, a solvent and the like was distilled was discharged. The monomer, the solvent and the like that were distilled were cooled with a condenser and collected as a distillate. A time when 60 minutes had elapsed from a time when the temperature in the reactor had become stable at 235° C. after the start of the feed of the monomer mixture liquid was defined as a collection starting point, from which the reaction was continued for 48 minutes and then a macromonomer composition UM-1 was collected. During this period, 2.34 kg of the monomer mixture liquid was fed to the reactor, and 1.92 kg of the macromonomer composition was collected from the thin-film evaporator. Moreover, 0.39 kg of the distillate was collected in a distillation tank.

The distillate was analyzed by gas chromatography, and it was found that 100 parts by weight of the distillate contained 31.1 parts of LMA, 16.4 parts of AA, and 52.5 parts of the solvent and others.

From the amount and the composition of the monomer mixture liquid fed, the amount of the macromonomer composition collected, and the amount and the composition of distillate collected, the reaction rate of the monomer was calculated to be 90.2%, and the constitutional monomer composition ratio of the macromonomer composition UM-1 was calculated to be LMA to AA=76.0 to 24.0 (weight ratio).

The molecular weight of the macromonomer composition UM-1 was measured by gel permeation Chromatography (hereinafter referred to as "GPC") using tetrahydrofuran as an eluate and the polystyrene-equivalent weight average molecular weight (hereinafter referred to as "Mw") and the polystyrene-equivalent number average molecular weight (hereinafter referred to as "Mn") were 3,800 and 1,800, respectively. Additionally, the concentration of terminal ethylenically unsaturated bond in the macromonomer composition was determined through $^1$H-NMR measurement of the macromonomer composition. From the concentration of terminal ethylenically unsaturated bond obtained by $^1$H-NMR measurement, Mn obtained by GPC, and the constitutional monomer ratio, the introduction ratio of the terminal ethylenically unsaturated bond (hereinafter referred to as "F value") of the macromonomer composition UM-1 was calculated to be 97%.

The produced macromonomer composition UM-1 was dissolved by heating in an appropriate amount of n-heptane, and then n-heptane was added so that the solid concentration would become 30.0%±0.5%. Thus, n-heptane solution UM-1HP containing the macromonomer composition UM-1 was produced. The solid concentration was measured from a heat-calculated fraction after heating at 150° C. for one hour.

As to starting materials including a monomer, a polymerization solvent, a polymerization initiator and the like, commercially available industrial products were used as received without performing any treatment, such as purification.

Example 1

Production of Polymer Microparticles TF-1

For a polymerization reaction was used a reactor having a capacity of 3 liters, equipped with a stirring mechanism consisting of an anchor type stirring blade and further equipped with a thermometer, a reflux condenser, and a nitrogen introduction tube. The reactor was charged with 9.3 parts (2.8 parts in terms of pure content of UM-1) of the UM-1HP produced in Production Example 1 and 6.0 parts of sorbitan monooleate ("REODOL AO-10" manufactured by KAO Corp.) as a dispersion stabilizer and 158.0 parts of n-heptane as a polymerization solvent, which were stirred and mixed while the solution was kept at a temperature of 40° C., so that an oil phase was prepared. The oil phase was stirred at 40° C. for 30 minutes and then was cooled to 20° C.

On the other hand, into another container were charged 100.0 parts of AA, 7.82 parts (equivalent to 1.74 mol % relative to a monofunctional monomer) of polyethylene glycol diacrylate ("ARONIX M-240" manufactured by TOAGOSEI CO., LTD., average molecular weight 324), 0.053 part of hydroquinone, and 88.0 parts of ion exchange water, which were stirred to be dissolved uniformly. Furthermore, while the mixed liquid was cooled so that the temperature thereof might be kept at 40° C. or lower, 70.8 parts of a 25% aqueous ammonia solution was added slowly to neutralize the mixed liquid. Thus, a monomer mixed liquid was obtained.

The stirring revolution speed was set to be a predetermined one and then 40% by weight (106.7 parts) of the obtained monomer mixed liquid was charged into the reactor. The temperature in the reactor was kept at 20° C. Stirring was continued as it was to prepare a dispersion liquid in which the monomer mixed liquid wad dispersed in an oil phase. After that, an aqueous solution of 0.10 part of ammonium persulfate and 1.18 part of ion exchange water was added thereto. Additionally, nitrogen was blown into the dispersion liquid to remove oxygen in the reactor. At a time when 1 hour and 40 minutes had passed since the charging of the monomer mixture, an aqueous solution in which 0.0013 part of iron sulfate heptohydrate and 0.074 part of sodium (Na) hydrosulfite were dissolved in 1.67 part of ion exchange water was added through an addition port mounted at the upper portion of the reactor. The temperature in the reactor increased immediately after the start of the feed, and this confirmed that polymerization was initiated. The increased internal temperature reached the peak in about 6.5 minutes, and the temperature was 41.7° C. Then, the temperature of a reaction liquid was decreased.

The reaction liquid was left to be cooled to 20° C., and then remaining 60% by weight (160.0 parts) of the prepared monomer mixed liquid was added to the reaction liquid and dispersed. After that, an aqueous solution of 0.14 part of ammonium persulfate and 1.69 part of ion exchange water was added thereto. At a time when 30 minutes had passed since the charging of the monomer mixture, the stirring revolution speed was increased by 1.5 times, and then, an aqueous solution in which 0.0019 part of iron sulfate heptohydrate and 0.11 part of sodium hydrosulfite were dissolved in 2.4 parts of ion exchange water was immediately added through an addition port mounted at the upper portion of the reactor. The temperature in the reactor increased immediately after the start of the feed, and this confirmed that polymerization was initiated. The increased internal temperature reached the peak in about 8 minutes, and the temperature was 38.8° C. Then, the reaction liquid was cooled to the room temperature to obtain an in-oil dispersion liquid of polymer microparticles TF-1.

When the in-oil dispersion liquid of TF-1 was discharged from the reactor, the dispersion liquid was filtered using a filter having a mesh opening of 75 μm. Filterability was very good and the filtration was successfully completed without occlusion until the end. When the attachment of a resin to the inner wall surface of the reactor was checked after the discharge, the resin was slightly found at the vicinity of the liquid surface of the dispersion liquid and it was confirmed that the polymer microparticles TF-1 could be produced stably.

Figure 1:
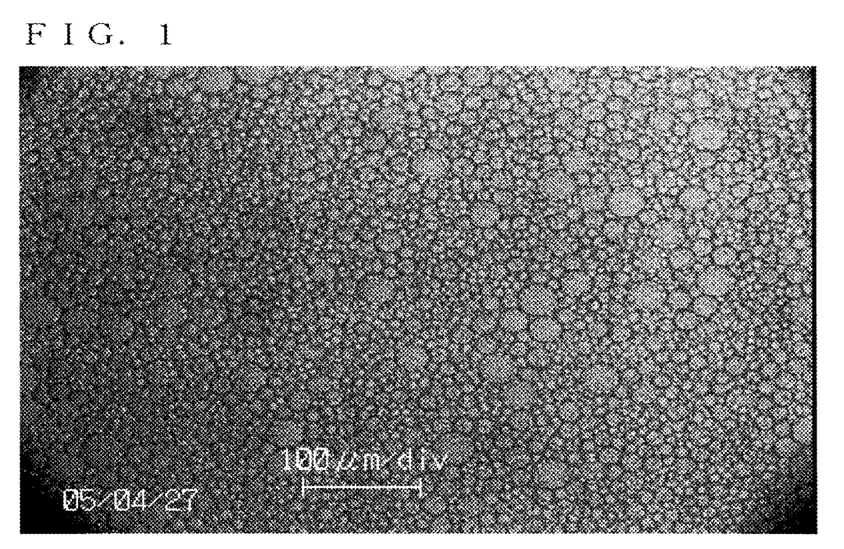
FIG. 1 is a microscope photograph of polymer microparticles TF-1 (after polymerization, in-oil dispersion)
Figure 2:
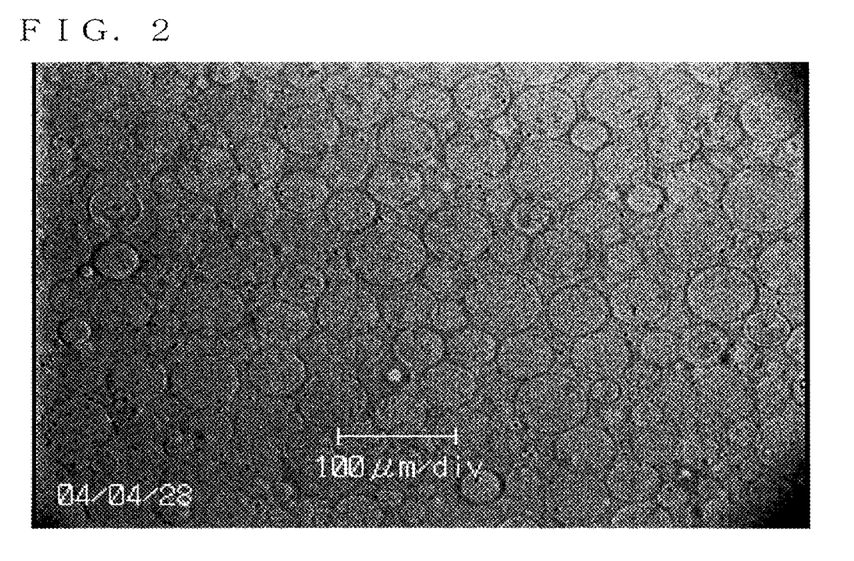
FIG. 2 is a microscope photograph of polymer microparticles TF-1 (after polymerization, in-water dispersion)

When a part of the in-oil dispersion liquid of TF-1 was sampled and was observed with a digital microscope ("VH-6000" manufactured by KEYENCE CORPORATION) at a magnification of 450, spherical microparticles having a distribution centering approximately 10 to 20 μm were observed. The photograph thereof is shown in FIG. 1. No aggregated particles composed of particles united together were observed. For a sample prepared by drying the in-oil dispersion liquid at 110° C. for one hour, the water absorption ratio (see the polymer microparticles analysis condition (2) below) was measured to be 23.3. When the dried sample was dispersed in an excessive amount of ion exchange water to be saturated and swollen and was observed at a magnification of 450, spherical microparticles having a distribution centering approximately 30 to 40 μm were observed. The photograph thereof is shown in FIG. 2. For the water-saturated-swollen particles TF-1, particle size distribution measurement (see the polymer microparticles analysis condition (3) below) was performed using a laser diffraction scattering type particle size distribution analyzer. The obtained particle size distribution had a single peak, and the water-saturated-swollen particle size was 42.4 μm. It was confirmed that the polymer microparticles TF-1 had a water absorption capacity, kept spherical shape also when it was swollen due to water absorption, and was primarily dispersed in water. Moreover, for a sample prepared by heating the dispersion liquid of TF-1, thereby azeotropically distilling water and heptane contained in the particle to remove water to a dehydration degree of 95%, followed by removal of the solvent and powdering, the amount of a wet sieve residue (see the polymer microparticles analysis condition (4) below) was measured to be 0.034%. The polymer microparticles TF-1 were confirmed to contain no coarse particles greater than 150 μm also when they were saturated and swollen with water after the azeotropic dehydration. The results are shown in Table 1.

In Table 1, "Condition of attachment to wall" is a result of visual observation of a resin attachment to the inner wall surface of the reactor after the completion of the reaction; "◯" indicates that there was almost no attachment, "Δ" indicates that there was attachment at a part corresponding to the liquid surface, and "X" indicates that there was remarkable attachment on the whole wall.

"Polymerization slurry filterability" is a result of observation of the filterability performed when a resulting dispersion liquid was filtered with a filter having a mesh opening of 75 μm; "◯" indicates that clogging of the filter did not occur, "Δ" indicates that clogging occurred once or twice, and "X" indicates that filtration at 75 μm failed.

"Appearance of wet sieve residue after azeotropic dehydration" is a result obtained by observing the wet sieve residue of a powdered sample prepared by dehydration, and aggregates means that there was an aggregate composed of aggregated particles.

Example 2

Production of Polymer Microparticles TF-2

Production was conducted in the same manner as that in Example 1, except for adding p-methoxyphenol as a hydrophilic polymerization inhibitor to the monomer mixed liquid. The results are shown in Table 1.

Example 3

Production of Polymer Microparticles TF-3

Production was conducted in the same manner as that in Example 1, except that nitrogen gas containing 5% oxygen was blown into the reactor from when the internal temperature reached the peak at the first step polymerization until 20 minutes before addition of sodium hydrosulfite at the second step polymerization instead of using hydroquinone, and that nitrogen gas was kept blowing for 20 minutes after stopping blowing the nitrogen mixed gas containing 5% oxygen to remove oxygen. The results are shown in Table 1.

Example 4

Production of Polymer Microparticles TF-4

Production was conducted in the same manner as that in Example 1, except that an aqueous solution of 0.041 part of 35% hydrogen peroxide solution and 1.16 part of ion exchange water was added at a time when the first step polymerization was finished and the temperature of the reaction liquid was cooled down to 35° C. instead of using hydroquinone. The results are shown in Table 1.

Example 5

Production of Polymer Microparticles TF-5

Production was conducted in the same manner as that in Example 1, except that the stirring revolution speed was maintained constant from beginning to end instead of using hydroquinone. The results are shown in Table 1.

Example 6

Production of Polymer Microparticles TF-6

Production was conducted in the same manner as that in Example 1, except that 8.8 parts of sorbitan monooleate was used instead of 9.3 parts of UM-1HP (pure content 2.8 parts) and 6.0 parts of sorbitan monooleate, and that 164.5 parts of n-heptane was used as a polymerization solvent. The results are shown in Table 1.

Comparative Example 1

Production of Polymer Microparticles TF-7

A reactor having a capacity of 3 liters same as in Example 1 was used. The reactor was charged with 9.3 parts (2.8 parts in terms of pure content of UM-1) of the UM-1HP and 6.0 parts of sorbitan monooleate ("REODOL AO-10" manufactured by KAO Corp.) and 400.0 parts of n-heptane as a polymerization solvent, which were stirred and mixed while the solution was kept at a temperature of 75° C., so that an oil phase was prepared.

On the other hand, into another container were charged 100.0 parts of AA, 7.66 parts (equivalent to 1.74 mol % relative to a monofunctional monomer) of polyethylene glycol diacrylate ("ARONIX M-240" manufactured by TOAGOSEI CO., LTD., average molecular weight 324), and 88.0 parts of ion exchange water, which were stirred to be dissolved uniformly. Furthermore, while the mixed liquid was cooled so that the temperature thereof would be kept at 40° C. or lower, 70.8 parts of a 25% aqueous ammonia solution was added slowly to neutralize the mixed liquid. Thus, a monomer mixed liquid was obtained.

The stirring revolution speed was set to be a predetermined one, 0.25 part of ammonium persulfate was solved in the prepared monomer mixed liquid, and then dropped into the reactor. The temperature in the reactor was kept at 75° C. Attachment of a gel to the surface of the reaction liquid came to be observed since the time when about 10 minutes had passed since the start of the dropping of the aqueous solution of a monomer, and the growth of the attached gel with lapse of time was observed. The dropping of the aqueous solution of a monomer was finished over two hours and heating and stirring were continued for 60 minutes.

When the resulting in-oil dispersion liquid TF-7 was discharged from the reactor, filtration was tried using a filter having a mesh opening of 75 μm, but clogging occurred immediately and the liquid was not able to be filtered. Therefore, the dispersion liquid was filtrated with a 100-mesh filter fabric (a mesh opening of about 180 μm) to separate a gelatinous material on the filter fabric. This gelatinous material was dried at a temperature of 110° C. for one hour and weighed, and as a result, it was equivalent to about 66 parts. The dispersed liquid passed through the filter fabric was dried at 110° C. for one hour and the passed material was swollen with water. For the water-saturated-swollen particles which were ones obtained by filtering with a 100-mesh filter fabric, particle size distribution measurement (see the polymer microparticles analysis condition (3) below) was performed using a laser diffraction scattering type particle size distribution analyzer. The water-saturated-swollen particle size was about 250 μm. Results are shown in Table 1.

(2) Water Absorption Ratio

The water absorption ratio was measured according to the following method. The measuring device is illustrated in FIG. 3.

Figure 3:
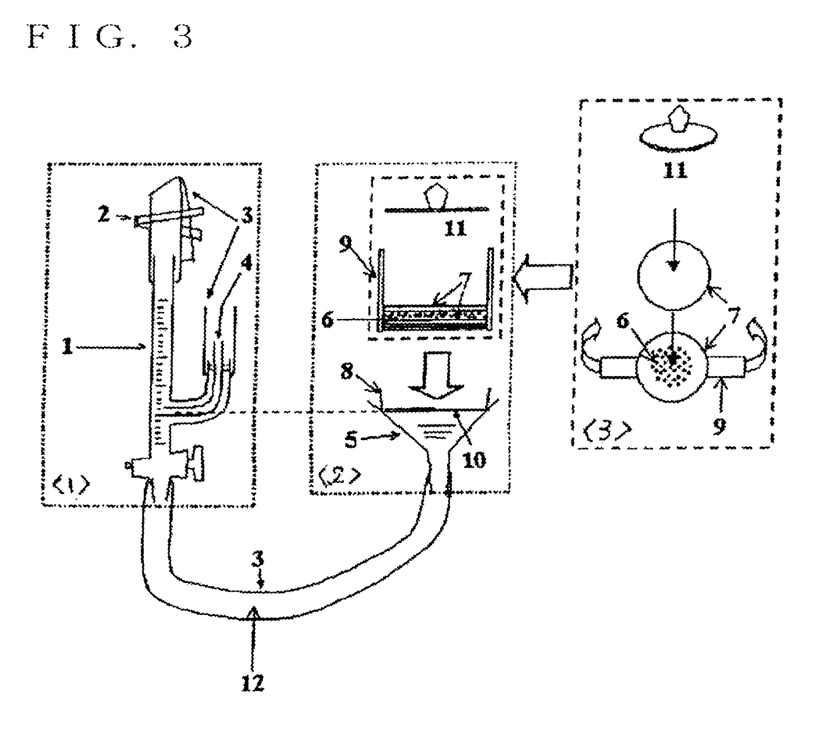
FIG. 3 is a diagram showing an apparatus for the measurement of the water absorption ratio of polymer microparticles.

The measuring device is composed of <1> to <3> shown in FIG. 3.

<1> is consisting of a burette 1 having a branch pipe for air ventilation, a pinch cock 2, a silicone tube 3, and a polytetrafluoroethylene tube 4.

In <2>, a supporting cylinder 8 having many holes in its bottom is mounted on a funnel 5, and a filter paper 10 for device is mounted thereon.

In <3>, a sample 6 of the polymer microparticles is inserted into two filter papers 7 for fixing sample, and the filter papers for fixing sample are fixed with an adhesive tape 9. All the filter papers to be used are "ADVANTEC No. 2" having an inner diameter of 55 mm.

<1> and <2> are linked with the silicone tube 3.

The levels with respect to the burette 1 of the funnel 5 and the supporting cylinder 8 are fixed, and the lower end of the polytetrafluoroethylene tube 4 disposed within the burette branch pipe and the bottom of the supporting cylinder 8 are set to be at the same level (dotted line in FIG. 3).

The measuring method is described below.

The pinch cock 2 in <1> was released, and ion exchange water was charged from the top of the burette 1 through the silicone tube 3 so that the space from the burette 1 to the filter paper 10 for device was filled with ion exchange water 12. Subsequently, the pinch cock 2 was closed and air was removed through the polytetrafluoroethylene tube 4 connected to the burette branch pipe with a rubber stopper. Thus, a condition was obtained such that ion exchange water 12 was continuously fed from the burette 1 to the filter paper 10 for device.

TABLE 1

|  | Example 1 | Example 2 | Example 3 | Example 4 | Example 5 | Example 6 | Comparative Example 1 |
|---|---|---|---|---|---|---|---|
| Polymer microparticles | TF-1 | TF-2 | TF-3 | TF-4 | TF-5 | TF-6 | TF-7 |
| Crosslink density (mol %) | 1.74 | 1.74 | 1.74 | 1.74 | 1.74 | 1.74 | 1.74 |
| Sorbitan monooleate | 6.0 | 6.0 | 6.0 | 6.0 | 6.0 | 8.79 | 6.0 |
| UM-1HP (pure content) | 2.79 | 2.79 | 2.79 | 2.79 | 2.79 | 0 | 2.79 |
| Condition of attachment on wall | ○ | ○ | ○ | ○ | Δ | Δ | X |
| Filterability of polymerization slurry | ○ | ○ | ○ | ○ | ○ | Δ | X |
| Swollen particle diameter (μm) | 42.4 | 42.8 | 41.9 | 41.7 | 42.6 | 42.1 | about 250 |
| Water absorption ratio (times) | 23.3 | 23.0 | 22.9 | 22.3 | 23.2 | 22.6 | 82.3 |
| Wet sieve residue (%, after dehydration) | 0.034 | 0.021 | 0.019 | 0.041 | 0.145 | 0.197 | Unmeasurable |

The polymer microparticles analysis conditions (1) to (4) used in Examples are as follows.

(1) Solid Concentration

The weight (a) of about 1 g of a sample was measured, the weight (b) of a residue after drying in a windless oven at a temperature of 150° C. for 60 minutes was measured, and then the solid concentration was calculated by the following equation. For the measurement a weighing bottle was used. Other operations were performed in accordance with JIS K0067-1992 (Test methods for loss and residue of chemical products).

Solid concentration (%)=(b/a)×100

After that, excess ion exchange water 12 which oozed from the filter paper 10 for device was removed, and then a read graduation (a) of the burette 1 was recorded.

A dry powder was sampled in an amount of 0.1 to 0.2 g, and then the powder was placed uniformly on the center of the filter paper 7 for fixing sample as illustrated in <3>. Another filter paper was used to sandwich the sample and the two filter papers were adhered with an adhesive tape 9 to fix the sample. The filter papers between which the sample was fixed were put on the filter paper 10 for device as illustrated in <2>.

Subsequently, a read graduation (b) of the burette 1 after a lapse of 30 minutes from a time when a lid 11 was put on the filter paper 10 for device was recorded.

The total (c) of the water absorption of the sample and the water absorption of the two filter papers 7 for fixing sample was calculated by (a–b). By the same operation, the water absorption (d) of only the two filter papers 7 containing no water-absorptive polymer sample was measured.

The above-mentioned operations were performed and a water absorption ratio was calculated from the following equation. As to the solid concentration to be used for the calculation, a value measured by the method (1) was used.

Water absorption ratio (times)=(c–d)/{Weight of sample (g)×(Solid concentration (%)/100)}+100/ (Solid concentration (%))

(3) Water-Swollen Particle Size

To 0.02 g of a sample for measurement was added 20 ml of ion exchange water, followed by shaking well. Thus, the sample was dispersed uniformly. For a dispersion liquid resulting from dispersion continued for 30 minutes or more in order to bring the polymer microparticles into a water-saturated-swollen state, the particle size distribution was measured after one-minute application of ultrasonic wave by using a laser diffraction scattering type particle size distribution analyzer ("MT-3000" manufactured by NIKKISO CO., LTD.). Ion exchange water was used as a circulated dispersion medium used in the measurement and the refractive index of the dispersion was adjusted to 1.53. The median diameter (μm) was calculated from the particle size distribution on volume basis obtained by the measurement, and it was defined as a water-swollen particle size.

(4) Measurement of Amount of Particle Having Water-Swollen Particle Size of 150 μm or Larger (a Wet Sieving Residue Method)

Measurement was performed in accordance with JIS K 0069-1992 (test method for sieving of chemical products).

A sample in an amount corresponding to 50 g in terms of solid concentration was weighed and ethanol was added thereto in the same amount as the sample to loosen well. Then the liquid was poured slowly into 3.0 liters of ion exchange water under stirring and stirred for 30 minutes to prepare a water-swollen dispersion liquid of the sample. After confirmation of the uniform dispersion, the dispersion liquid was poured onto a sieve having a diameter of 70 mm and a mesh opening of 150 μm and allowed to pass therethrough. The residue on the sieve was washed with a sufficient amount of water while taking care that the residue does not spill off. Subsequently, the sieve after measurement was dried in a circulation dryer at a temperature of 150° C. for 30 minutes and cooled in a desiccator, and then the weight of the sieve after drying (the total weight of the sieve and the residue) was measured.

The wet sieve residue (%) calculated by the following formula was defined as the amount of particle having a water-swollen particle size of 150 μm or larger. Operations other than those described above were performed in accordance with JIS K 0069-1992 (test method for sieving of chemical products).

Wet sieve residue (%)=(Weight of sieve after test– Weight of sieve)/{(Weight of sample used×(Solid concentration/100))}×100

INDUSTRIAL APPLICABILITY

According to the production method of the present invention, a high-quality spherical hydrophilic polymer microparticles remarkably higher uniform in particle size than those by conventional technologies can be produced at high productivity while keeping high dispersion stability and polymerization stability without causing aggregation, clumping and adhesion to a polymerization apparatus of particles during or after polymerization. Moreover, according to the production method of the present invention, even if a particle having a high degree of crosslinking is produced using a large amount of a multifunctional vinyl-based monomer, a high-quality hydrophilic crosslinked polymer microparticles uniform in particle size can be produced without causing aggregation, clumping and adhesion to a polymerization apparatus of particles.

What is claimed is:

1. A method for producing polymer microparticles, the method comprising at least two steps of inverse suspension polymerization of a vinyl-based monomer,
   wherein the inverse suspension polymerization is performed in the presence of:
   (i) a polymerization initiator comprising a water-soluble oxidizing agent and a water-soluble reducing agent, and
   (ii) a dispersion stabilizer.

2. The method for producing polymer microparticles according to claim 1, further comprising adding hydrogen peroxide to a reaction liquid before adding an aqueous solution of a monomer.

3. The method for producing polymer microparticles according to claim 1, further comprising adding a hydrophilic polymerization inhibitor having an octanol/water partition coefficient (logPow) of 1.6 or less to an aqueous solution of the vinyl-based monomer.

4. The method for producing polymer microparticles according to claim 1, wherein oxygen is charged into a reactor.

5. The method for producing polymer microparticles according to claim 1, wherein the stirring revolution speed is increased at least once before the inverse suspension polymerization is completed.

6. The method for producing polymer microparticles according to claim 1, wherein the dispersion stabilizer comprises a macromonomer having a radically polymerizable unsaturated group at an end of a polymer derived from a vinyl-based monomer.

7. The method for producing polymer microparticles according to claim 1, wherein said polymer microparticles have a crosslinking density of 0.5% or more by mol.

8. The method for producing polymer microparticles according to claim 1, wherein said polymer microparticles have an average particle size in a saturated water-swollen state of 2 to 100 μm, and a content ratio of particles having a particle size of 150 μm or larger in a saturated water-swollen state of 1.0% or less by weight.

9. The method for producing polymer microparticles according to claim 1, wherein said polymer microparticles have a water absorption ratio of 5 to 50 times, an average particle size in a saturated water-swollen state of 5 to 70 μm, and a content ratio of particles having a particle size of 150 μm or larger in a saturated water-swollen state of 0.3% or less by weight.

* * * * *